US012487942B2

United States Patent
Raasch et al.

(10) Patent No.: US 12,487,942 B2
(45) Date of Patent: Dec. 2, 2025

(54) ENHANCED PAGE INFORMATION CO-PROCESSOR

(71) Applicant: ADVANCED MICRO DEVICES, INC., Santa Clara, CA (US)

(72) Inventors: Steven Raasch, Boxborough, MA (US); Andrew G. Kegel, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/380,954

(22) Filed: Oct. 17, 2023

(65) Prior Publication Data

US 2024/0119010 A1 Apr. 11, 2024

Related U.S. Application Data

(63) Continuation of application No. 16/712,129, filed on Dec. 12, 2019, now Pat. No. 11,816,037.

(51) Int. Cl.
*G06F 12/10* (2016.01)
*G06F 9/50* (2006.01)
(Continued)

(52) U.S. Cl.
CPC ........ *G06F 12/1009* (2013.01); *G06F 9/5016* (2013.01); *G06F 11/0772* (2013.01);
(Continued)

(58) Field of Classification Search
CPC .............. G06F 12/1009; G06F 9/5016; G06F 11/0772; G06F 12/0246; G06F 12/0871;
(Continued)

(56) References Cited

U.S. PATENT DOCUMENTS 7,930,519 B2   4/2011  Frank
10,592,428 B1 *  3/2020  Saidi .................... G06F 12/0891
(Continued)

FOREIGN PATENT DOCUMENTS

JP    H07152654 A    6/1995

OTHER PUBLICATIONS

Extended European Search Report issued in Application No. 20899516, mailed Dec. 21, 2023, 7 pages.
(Continued)

*Primary Examiner* — Hua J Song (57) ABSTRACT

A processing system includes a primary processor and a co-processor. The primary processor is couplable to a memory subsystem having at least one memory and operating to execute system software employing memory address translations based on one or more page tables stored in the memory subsystem. The co-processor is likewise couplable to the memory subsystem and operates to perform iterations of a page table walk through one or more page tables maintained for the memory subsystem and to perform one or more page management operations on behalf of the system software based the iterations of the page table walk. The page management operations performed by the co-processor include analytic data aggregation, free list management and page allocation, page migration management, page table error detection, and the like.

20 Claims, 4 Drawing Sheets

(51) Int. Cl.
    *G06F 11/07*     (2006.01)
    *G06F 12/02*     (2006.01)
    *G06F 12/0871*   (2016.01)
    *G06F 12/0882*   (2016.01)
    *G06F 12/1009*   (2016.01)
    *G06F 12/1027*   (2016.01)
    *G06F 12/123*    (2016.01)

(52) U.S. Cl.
    CPC ...... *G06F 12/0246* (2013.01); *G06F 12/0871* (2013.01); *G06F 12/0882* (2013.01); *G06F 12/1027* (2013.01); *G06F 12/123* (2013.01)

(58) Field of Classification Search
    CPC ............. G06F 12/0882; G06F 12/1027; G06F 12/123; G06F 11/073; G06F 11/0751; G06F 2212/651; G06F 3/0647; G06F 2212/681; Y02D 10/00
    USPC ....................................................... 711/206
    See application file for complete search history.

(56) References Cited

U.S. PATENT DOCUMENTS

| | | |
|---|---|---|
| 2012/0233439 A1 | 9/2012 | Ginzberg et al. |
| 2014/0101405 A1 | 4/2014 | Papadopoulou et al. |
| 2015/0100753 A1 | 4/2015 | Shen et al. |
| 2015/0347044 A1 | 12/2015 | Gschwind |
| 2017/0206169 A1 | 7/2017 | Coppola et al. |

OTHER PUBLICATIONS

Office Action mailed Dec. 3, 2024 for Japanese Patent Application No. 2022-534363, 10 pages.

Chinese Office Action mailed May 20, 2025 for Application No. 202080091695.2, 13 pages.

Indian Office Action mailed Apr. 8, 2025 for Application No. 202217030883, 8 pages.

* cited by examiner

ENHANCED PAGE INFORMATION CO-PROCESSOR

CROSS-REFERENCE TO RELATED APPLICATIONS

The present application is a Continuation application of U.S. patent application Ser. No. 16/712,129, now U.S. Pat. No. 11,816,037, entitled "ENHANCED PAGE INFORMATION CO-PROCESSOR", and filed on Dec. 12, 2019, the entirety of which is incorporated by reference herein.

BACKGROUND

Many processing systems employ a paged memory allocation scheme in which data is moved between secondary storage (e.g., mass storage) and memory in typically fixed-sized blocks, referred to as "pages." Each page represents a corresponding subset of memory address locations. A set of one or more page tables is used to facilitate translation of a virtual memory address for a referenced memory location to the physical memory address of that memory location. Typically, these page tables are stored in memory, with the exception of a translation lookaside buffer (TLB) that acts as a cache storing copies of a small subset of the page table entries. As such, unless an address translation involves one of the few page table entries present in the TLB, the address translation process involves access to a page table entry of a page table in memory, and thus involves one or more memory access operations. As such, an operating system or hypervisor expends a considerable fraction of the processing bandwidth of a central processing unit (CPU) or other primary processor in walking the page tables in memory and otherwise managing the page tables. The loading of the page management process on the primary processor system continues to increase because while memory sizes have grown, page size has tended to remain fixed (e.g., at 4 kilobytes) for legacy compatibility and other reasons, and thus leading to ever-larger page tables for the primary processor to manage.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

In a conventional processing system, system software (that is, one or both of the operating system (OS) or hypervisor (HV)) walks page tables periodically, reading and selectively clearing the accessed (A), dirty (D), and other status bits. By sampling the pages as the page table walk progresses, the system software is able to collect a limited amount of usage information that is provided to a memory manager component for use in deciding which pages to evict so as accept incoming pages for meeting memory demands. However, while system memory sizes have increased, the page sizes have stayed relatively fixed (e.g., 4 kilobyte pages) for various reasons. As a result, page table sizes have increased and thus the proportion of processor cycles spent by the system software in collecting page statistics increases, which takes away from the system's ability to execute user tasks and other high-priority tasks.

To reduce the memory management burden on the central processing unit (CPU), graphics processing unit (GPU), or other primary processor executing the system software, in at least one embodiment, a processing system employs a separate, dedicated enhanced page information co-processor (EPIC) that operates to offload some or all of the page management duties conventionally employed by the system software, and, in some embodiments, further providing additional enhanced page management features. This co-processor, referred to herein as a "memory processing unit" or "MPU", which has limited general processing capabilities compared to the primary processor, is configured by the system software to perform iterations of a page table walk of one or more page tables and to aggregate or otherwise generate various information along the way without utilizing the resource of the primary processor. The information generated during the page walk iterations includes, for example, information pertaining to which pages have been accessed, which pages have been modified (that is, are "dirty"), the frequency of access, the integrity of the page table entry or page table itself, and the like. The MPU utilizes this information to generate one or more ordered lists, such as an accessed page list or a dirty page list, which in some embodiments are provided to the system software and used by the system software for selection of pages to evict, or in other embodiments the MPU performs the selection and eviction of pages based on this information independent of the primary processor and in accordance with policies specified by the system software. Further, in some embodiments, the processing system employs a non-uniform memory access (NUMA) architecture having a plurality of memories and the MPU operates to identify candidate pages for migration between memories and, in some embodiments, inform the system software of these candidate pages for page migration controlled by the system software, or, in other embodiments, to implement the page migrations independent of the system software. By reducing the burden on the system software by offloading various page management operations, the MPU allows the primary processor to spend a greater proportion of cycles on execution of other tasks.

Figure 1:
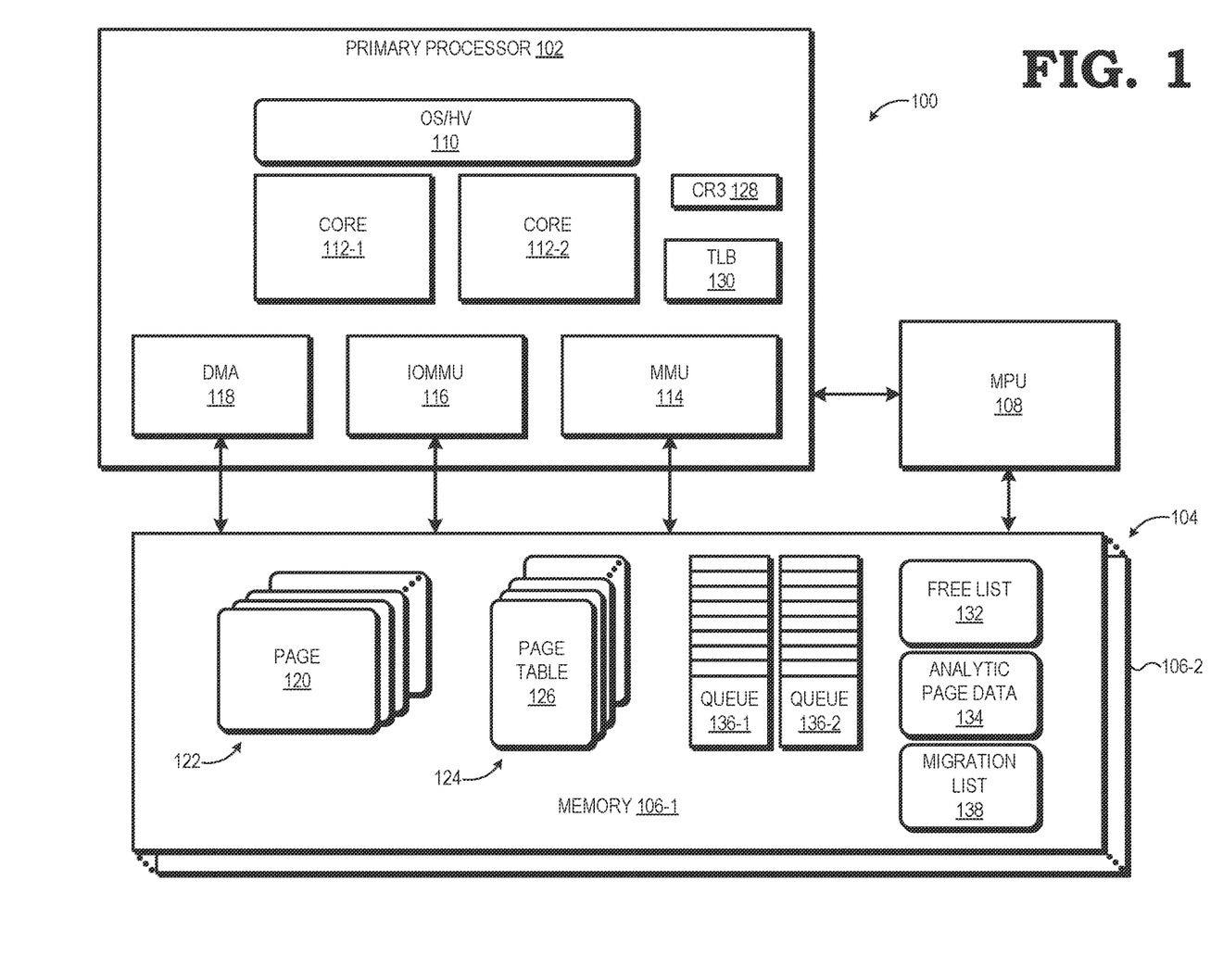
FIG. 1 is a block diagram illustrating a processing system employing a co-processor for memory page management in accordance with some embodiments.

FIG. 1 illustrates a processing system 100 employing an enhanced page information co-processor (EPIC) for offloading memory page management from a primary processor and for providing supplemental memory page management operations in accordance with some embodiments. The processing system 100 is utilized in any of a variety of electronic devices, including desktop computers, laptop computers, tablet computers, servers, compute-enabled cellular phones ("smartphones"), gaming consoles, compute-enabled televisions, and the like. The processing system 100 includes one or more primary processors 102, a memory subsystem 104 composed of one or more memories 106

(e.g., memory 106-1 and memory 106-2), and an EPIC in the form of a memory processing unit (MPU) 108. The primary processor 102, memory 106, and MPU 108 are connected for communication of signaling and data via one or more busses, networks, or other interconnects, which have been omitted from FIG. 1 for ease of illustration.

The primary processor 102 operates to execute one or more system software applications having executable instructions stored in at least one memory 106 for management of the overall system 100 as well as to facilitate the execution of user software applications. These system software applications include, for example, one or both of an operating system (OS) or a hypervisor (HV), which are referenced in combination or the alternative as OS/HV 110. Examples of the primary processor 102 include a central processing unit (CPU), a graphics processing unit (GPU), an artificial intelligence (AI) processor, an application specific integrated circuit (ASIC), and the like. For purposes of illustration, the primary processor 102 is described below in an example implementation as a CPU, and more specifically as a CPU that implements an x86 instruction set architecture (ISA), but the corresponding description applies equally to other processor types and other ISAs unless otherwise noted.

The primary processor 102 includes one or more processor cores 112, such as processor cores 112-1 and 112-2, that operate to execute the OS/HV 110 as well as user software applications implemented at the system 100. The primary processor 102 further includes one or more interfaces to the memory subsystem 104, such as one or more of a memory management unit (MMU) 114, an input/output MMU (IOMMU) 116, and a direct memory access (DMA) engine 118. As is known in the art, the MMU 114 generally operates to transfer data between the processor cores 112 (and one or more caches of an associated cache hierarchy (not shown)) and the one or more memories 106; the IOMMU 116 generally operates to transfer data between the cache hierarchy, the one or more memories 106, and one or more peripheral devices (not shown); and the DMA engine 118 operates to transfer data into and out of the one or more memories 106 without involvement of the processor cores 112 or the MMU 114.

In at least one embodiment, each memory 106 of the memory subsystem 104 is implemented as "paged" memory such that the set of physical storage locations of the memory 106 (or subset thereof) are logically partitioned into pages 120 of a page set 122. Typically, each page 120 of a given memory 106 is the same fixed size as all other pages of that same memory 106, where the page size often is set by a policy defined by the OS/HV 110. For example, for a variety of reasons including backward compatibility, the physical storage locations of a memory in an x86-based system are organized as pages 120 of 4 KB each, although different page sizes can be mixed under specific circumstances. Each page 120 is managed as a monolithic block with respect to the primary processor 102 accessing the memory 106. As such, when a page management operation is performed to transfer identified data from the memory 106 to a secondary storage component (e.g., a disk drive) of the computer system 100, the entire page 120 containing that data typically is transferred to the memory subsystem 104 as part of the page operation. Similarly, when performing a page-out operation to transfer identified data from the memory 106 to secondary storage, the entire page 120 containing the specified data is transferred. Although page sizes can vary, each page is transferred as a unit.

As the addressable memory space of the processing system 100 typically is considerably larger than the size of the one or more memories 106, only a subset of the available pages of data is able to be stored in a memory 106 at any given time. Accordingly, in at least one embodiment the OS/HV 110 employs a virtual memory management scheme having a virtual memory space employing a set of virtual addresses (also commonly referred to as "linear addresses") that is larger than the set of physical addresses of the storage locations of the one or more memories 106. With this scheme, the OS/HV 110 employs a virtual-to-physical address translation process to translate each virtual address to a corresponding physical address that is then used to access the corresponding page 120 in memory 106 (assuming the referenced page 120 has in fact been loaded into memory 106). To facilitate this virtual-to-physical address translation, the processing system 100 employs a page table structure 124 composed of one or more page tables 126. In at least one embodiment, the page table structure 124 is a layered page table structure such that one subfield of a virtual address identifies an entry in a first page table that points to a second page table, another subfield of the virtual address identifies an entry in the second page table that points to a third page table, and so on.

To illustrate, one conventional long-mode nesting paging scheme for 4 KB pages and 64-bit virtual addresses employs four layers of page tables. At the first layer is a Page-Map Level-4 (PML4) table that contains a plurality of entries, each entry pointing to a specific one of a plurality of Page Directory Pointer (PDP) tables. A nine-bit PML4 Offset field of the virtual address specifies which entry of the PML4 table is used. Each entry of each PDP table points to a specific one of a plurality of Page Directory (PD) tables, and a 9-bit PDP Offset subfield of the virtual address specifies the particular entry of the specified PDP table to use. Each entry of each PD table points to a specified one of a plurality of last-level page tables, and a 9-bit PD Offset field of the virtual address specifies the particular entry of the specified PD table to use. Each last-level page table includes a set of page table entries (PTEs), with each PTE storing a 52-bit physical address portion, which is combined with the bits of a 12-bit physical page offset subfield of the virtual address to generate the physical address that maps to the virtual address.

It will be appreciated that the processing system 100 typically supports a number of processes concurrently through context switching or another time-multiplexing approach, and some or all of these processes often have their own respective virtual address spaces. As such, each process or context typically employs its own separate page table structure 124. In the example long-mode layered paging scheme described above, the base address for the top table (the PML4 table) is specified using a specific control register 128 that stores an identifier of the process/context currently in operation and which serves to specify the base address. To illustrate, in the x86 context, this control register 128 is implemented by the CR3 register, which stores a process-context identifier (PCID) that identifies the current process/context and is used to calculate the base address for the PML4 table for the page table structure 124 used for that identified process/context. For ease of illustration, the operation of the processing system 100 is described below with reference to the above-described long-mode paging scheme and an example format of a PTE is described below with reference to FIG. 3. However, it will be appreciated that the techniques described herein are not limited to this example implementation but rather applies to any of a variety of paging schemes using the guidelines provided herein.

As the page tables 126 are stored in one or more memories 106, performing each virtual-to-physical address translation otherwise would involve a lengthy memory access operation. Accordingly, to facilitate rapid address translation, in at least one embodiment the primary processor 102 utilizes a translation lookaside buffer (TLB) 130, which is a cache structure that operates to store copies of a subset of the recently-used PTEs locally for ease of access by the MMU 114. As such, each time a page 120 is allocated in memory 106, the PTE from the page table 126 for that page 120 is also stored to the TLB 130, until the TLB 130 is full. Thereafter, one or more TLB management schemes are employed to determine which PTEs are to have copies stored in the TLB 130 and which are to have their copies evicted from the TLB 130 to make room for new incoming TLB entries. Such schemes are often based on recency of access, frequency of access, and the like. Conventionally, the MMU 114 manages the TLB 130. However, as described below, in some embodiments, the MPU 108 operates to perform some or all of the management functions for the TLB 130 in place of the MMU 114.

The MPU 108 is implemented as a co-processor to the one or more primary processors 102 for the purposes of one or both of: offloading conventional page management operations that are performed by the OS/HV 110 in conventional systems and thus consume a portion of the execution bandwidth of the processor cores 112; and providing enhanced page management operations that leverage the ability of the MPU 108 to dedicate its most or all of its execution bandwidth to page management operations. That is, with the exception of page management, the MPU 108, in at least one embodiment, has limited general processing capabilities compared to the primary processors 102 (that is, cannot perform the general duties of the primary processors 102). As such, in some embodiments the MPU 108 is implemented as a software or firmware instruction-execution processor, such as a reduced instruction set computer (RISC) processor, with the software/firmware instructions that manipulate the MPU 108 to perform the functions described herein stored in memory 106, in basic input/output system (BIOS) or other read-only memory (ROM), and the like. In other embodiments, the MPU 108 is implemented as hard-coded logic (e.g., an ASIC or other fixed-function integrated circuit) or programmable logic (e.g., a programmable logic device) that performs the described functionality. In still other embodiments, the MPU 108 is implemented as some combination of instruction-executing processor and hard-coded or programmable logic.

The MPU 108 operates to perform its various page management operations either responsive to commands from the OS/HV 110 or independent of any triggering command from the OS/HV 110. To illustrate, the page allocation process of the processing system 100 relies on the use of at least one free list 132 that identifies which physical pages 120 of the one or more memories 106 are "free"; that is, available for allocation to a corresponding virtual page. In some embodiments, the MPU 108 operates independently to periodically or otherwise repeatedly walk the page tables 126 of each page table structure 124 to identify those pages 120 that are not in use (e.g., have not been referenced and do not contain modified data) and mark any such pages 120 as free in the free list 132. In other embodiments, the MPU 108 performs a page table walk in response to a command to do so from the OS/HV 110, and this command could specify that only an identified page table structure 124 be "walked" for free list analysis. As another example, which is described in more detail below, the MPU 108 generates a list of pages that are candidates for page migration between respective memories 106 and provides this list to the OS/HV 110, and it is then the OS/HV 110 that selects which pages to migrate and controls the migration of the selected pages, whereas in other embodiments the MPU 108 identifies pages for migration and then implements the actual page migrations independent of the OS/HV 110 such that the resulting page migrations are transparent to the OS/HV 110. As yet another example, in some embodiments the MPU 108 operates to collect and analyze or otherwise manipulate various page statistics or other analytic data ("analytic page data 134") for the pages 120 as the MPU 108 walks the page tables 126, such as the number or ratio of modified pages to unmodified pages, etc. In some implementations, the MPU 108 operates to collect and process this data independent of direction from the OS/HV 110, while in other implementations the data collection process of the MPU 108 is triggered via a command from the OS/HV 110, which also may specify which types of data are to be collected and analyzed.

Regardless of whether a particular page management operation performed by the MPU 108 is triggered by system software or independent of commands from the system software, in at least one embodiment such operations are performed in compliance with one or more policies specified by the OS/HV 110. To illustrate, the OS/HV 110 can set the policy on management of a free list of pages available for allocation, for the type of page information to collect, for the selection and prioritization of page migration candidates, and the like.

The communication of commands, data, policy, and other information and signaling between the primary processor 102 and the MPU 108 can be conducted in any of a variety and combination of manners. In some embodiments, the processing system 100 employs a set of one or more queues 136, such as queues 136-1 and 136-2, in the memory 106 for facilitating communication. To illustrate, in one embodiment queue 136-1 is implemented as an input queue for receiving commands, configuration information, and other data from the primary processor 102 for access by the MPU 108, while queue 136-2 is implemented as an output queue for receiving analytic page data 134, updated free lists 132, and the like from the MPU 108 for access by the OS/HV 110. In other embodiments, a single queue 136 is used for both commands and information from the OS/HV 110 to the MPU 108 and vice versa, in which case the "packet" of information includes an identifier of the destination (primary processor or MPU), an identifier of the type of communication (e.g., command, list, statistical data, configuration data, etc.), and the like. In still other embodiments, different types of communications utilize different queues. For example, commands from the primary processor 102 to the MPU 108 are inserted into one queue 136, free lists 132 are inserted by the MPU 108 into another queue 136, etc. In addition to, or instead of, using memory-based queues or other memory-based data structures for command, data, and information passing between the primary processor 102 and the MPU 108, in some embodiments one or more busses or other interconnects extending between the primary processor 102 and the MPU 108 are used for communication between the primary processor 102 and the MPU 108. For example, the primary processor 102 issues commands to the MPU 108 via a Peripheral Component Interconnect-Express (PCIE) bus, Inter-chip Global Memory Interconnect (xGMI) bus, or other interconnect, and the MPU 108 signals a result of an operation via issuance of an interrupt via the same or different interconnect, while one or more queues 136 or other memory locations are used to buffer the data or information associated with the command or interrupt.

In its efforts to support the primary processor 102, there is risk that the MPU 108 and the primary processor 102 attempt to concurrently access the same memory page, the same page table or page table entry, the same TLB entry, and the like. Accordingly, in at least one embodiment, the MPU 108 operates in coordination with the primary processor 102 to avoid such concurrent access attempts. In some embodiments, this includes the use of "flags" that are selectively asserted so that only one component is manipulating a corresponding memory component at any given time in furtherance of safety or system-integrity policies, such as by preventing conflicting scheduling decisions. These "flags" typically are memory locations that are programmed with signal values (e.g., a mutex or semaphore), such that when this memory location is set to a specified value, the other processor avoids one or more types of memory-management operations.

Figure 2:
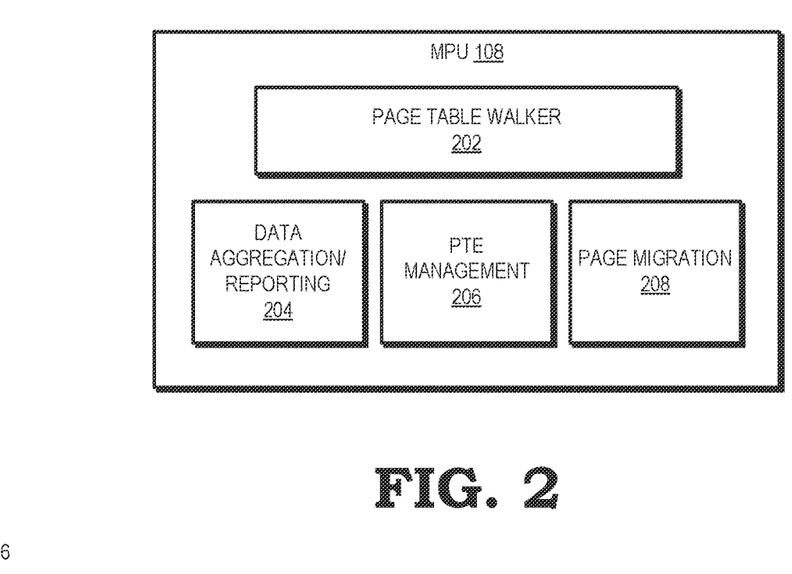
FIG. 2 is a block diagram illustrating the co-processor of FIG. 1 in greater detail in accordance with some embodiments.

FIG. 2 illustrates an implementation of the MPU 108 in greater detail. In some embodiments, the MPU 108 includes one or more of: a page table walker 202, a data aggregation/reporting module 204, a PTE management module 206, and a page migration module 208. As noted above, these components can be implemented at the MPU 108 via execution of corresponding instructions by a processor implementing the MPU 108, via hardcoded or programmable logic, or combinations thereof. The page table walker 202 operates to walk the page tables 126 of the page table structures 124 currently resident in the one or more memories 106. To this end, the page table walker 202 implements similar logic to the page table walking component found in a conventional MMU, which likewise walks page tables using any of a variety of conventional or proprietary page table walking algorithms. However, while a conventional MMU attempts to actually perform a virtual-to-physical address translation while performing a page table walk, the page table walker 202 does not need to perform such a translation, but rather walks the entire page table and examines the contents of each PTE contained therein. Moreover, while a conventional MMU typically is limited to walking only the page tables of the current process/context, in some embodiments the page table walker 202 is not so limited and instead walks the page tables 126 of some or all of the processes/contexts having a page table structure 124 resident in the memory 106. To illustrate, the page table walker 202 implements an array that stores the CR3 value for each process/context, and selects one CR3 value to identify the top level table for the page table structure 124 for the process/context associated with that CR3 value, walks the page tables of the page table structure 124, and when finished, selects the next CR3 value in the array and begins the page table walk process again with the page table structure 124 indexed with the newly selected CR3 value. The page table walking process is described in more detail below with reference to FIG. 4.

The data aggregation/reporting module 204 operates to collect data on the PTEs of the page tables 126 as the page table walker 202 walks the page tables 126 of a selected page table structure 124. This collected data is aggregated or otherwise analyzed at one or more levels of granularity, such as for the entire memory subsystem 104, on a per-memory basis, on a per-region basis, on a per-page basis, and the like. To illustrate, the data aggregation/reporting module 204 determines the number of modified (that is, "dirty") pages on a per-region basis, or an average number of modified pages for a plurality of memory regions of one of the memories 106, and the like. The data aggregation/reporting module 204 further operates to provide a representation of this captured/analyzed data to the primary processor 102 as analytic page data 134. The PTE management module 206 operates to utilize data gleaned by the data aggregation/reporting module 204 to manage the page tables 126 themselves. This includes, for example, modifying status/attribute fields of the PTEs of the page tables 126, marking pages as candidates for page migration, detecting and reporting errors in the page tables 126, identifying and handling orphaned pages, moving pages into and out of the free list 132, updating the TLB 130 to reflect changes in page locations and statuses, identifying pages for power tuning purposes, and the like. Further details on the operation of the modules 204 and 206 are described below with reference to FIG. 4

In some embodiments, the memory subsystem 104 has a non-uniform memory access (NUMA) configuration in which the primary processor 102 has access to different memories 106 at different speeds. In some embodiments, this difference in access time is based, at least in part, on the implementation of different types of memories. For example, one or more of the memories 106 is a volatile random access memory (RAM), while one or more other memories 106 is a Flash memory or other non-volatile memory. This difference in architecture can also be a result of different memory technologies. For example, one memory implements a dynamic RAM (DRAM) technology, while another memory 106 implements a static RAM (SRAM) technology, or one memory is a Dynamic Data Rate 2 (DDR2)-based DRAM while another memory is a Dynamic Data Rate 4 (DDR4)-based memory. Other contributors to the access speed differences include, for example, clock speed differences, differences in distance to the primary processor 102, differences in bus width, and the like. Moreover, in addition to, or instead of, access time differences, the different memories 106 often provide different advantages and disadvantages. For example, some types of memory provide slower access times but provide superior storage capacity or superior power consumption, whereas other memories may provide faster access times but may be susceptible to write-wear and other degradations proportional to their usage.

Accordingly, in at least one embodiment, the processing system 100 utilizes page migration to opportunistically identify situations in which moving an allocated page 120 from one memory 106 to another memory 106 provides an advantage, whether in speed of access, reduced power consumption, making room for additional pages at a faster memory, reducing write-wear, and the like. To this end, as the page table walker 202 walks the page tables 126, the page migration module 208 operates to identify whether the page 120 associated with the PTE currently being accessed and assessed is a candidate for page migration based on any of a variety of considerations, such information from the PTE, directives from the OS/HV 110, or from data collected during previous page table walks. In response to identifying a page 120 as a candidate for page migration, the page migration module 208, in some embodiments, modifies the associated PTE to signify the page 120 as a page migration candidate, or in other embodiments adds an identifier of the page 120 to a migration candidate list 138 (FIG. 1) maintained in a memory 106 of the memory subsystem 104. In some embodiments, the migration candidate list 138 is made available to the OS/HV 110, and it is the OS/HV 110 that selects pages to migrate from the migration candidate list 138 and then oversees the page migration for each page so selected. In other embodiments, the MPU 108 is authorized to autonomously handle page migrations without involving the OS/HV 110, and thus it is the page migration module 208 that selects pages for migration and then directs the migration of the pages using a DMA engine (not shown) implemented at the MPU 108 or alternatively using the DMA engine 118 of the primary processor 102 (noting that, as is typical, the DMA engine 118 operates to conduct memory operations, including the movement of data, without direct involvement of the OS/HV 110). The page migration process employed by the MPU 108 is described in greater detail below with reference to FIG. 5.

Figure 3:
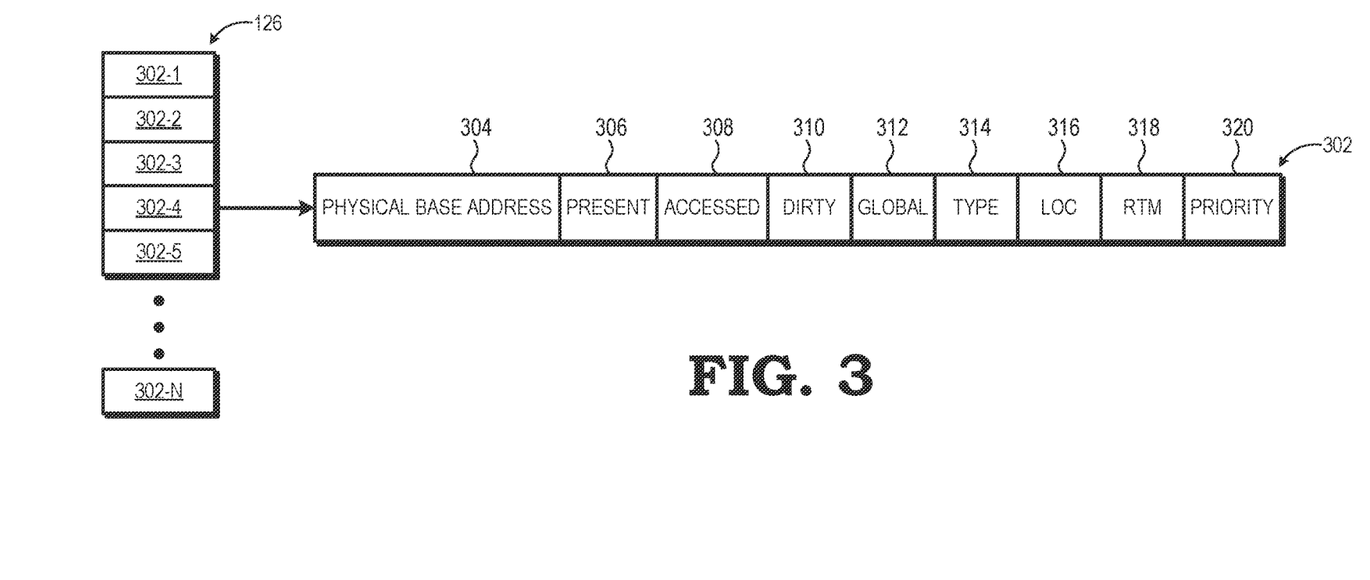
FIG. 3 is a block diagram illustrating a page table and corresponding page table entry (PTE) in accordance with some embodiments.

FIG. 3 illustrates an example format of the PTEs of a page table 126 in accordance with at least one embodiment. As explained above, the last level of a layered page table structure 124 or other page table structure 124 includes a plurality of page tables 126, with each page table 126 having a plurality of PTEs 302, such as the illustrated PTEs 302-1 to 302-N. Each valid PTE 302 corresponds to an allocated page 120 resident in a memory 106, and contains various information regarding the corresponding page 120. To illustrate, the PTE 302 includes a physical base address field 304 that contains a value that represents a base value of the physical address associated with the corresponding page. The PTE 302 further includes one or more status/attribute fields for the corresponding page 120. In at least one embodiment, some or all of the status/attribute fields of the PTE 302 can be modified by the MPU 108 based on policy specified by the OS/HV 110, based data aggregated by the data aggregation/reporting module 204, or a combination thereof.

The status/attribute fields of a PTE 302 typically include one or more of: a present (P) bit field 306 that stores a bit value that indicates whether the corresponding page 120 is in fact present in memory; an accessed (A) field 308 that stores a bit value that indicates whether the page 120 has been accessed; a dirty (D) field 310 that stores a bit value that indicates whether the page 120 has been modified since being loaded into memory; and a global page (G) field 312 that indicates whether the corresponding page 120 is a global page (where the TLB entries for global pages are not invalidated when there is a process/context switch and resulting update to the CR3 register 128).

As noted above, in some implementations the memory subsystem 104 employs a NUMA architecture of multiple memory types (where "type" in this context represent any of a variety of differences between memories 106, including architecture, technology, protocol, clock speed, distance, etc.), and thus the status/attribute fields of the PTE 302, in one embodiment, includes a type field 314 that stores a value that represents an identifier of the type of memory at which the corresponding page 120 is located. The type identifier identifies a corresponding type based on architecture or memory architectures, e.g., volatile vs. non-volatile; DRAM vs. SRAM; specific technologies, e.g., Flash vs. DDR SDRAM; classes of memory access speed (e.g., class 1 (fastest), class II (medium), class III (slowest)); storage size classes; power consumption classes; vulnerability to write wear; and the like. In other embodiments, the memory type is represented in a separate data structure indexed using, for example, the physical base address in the field 304 or other page identifier. Similarly, the PTE 302, in one embodiment, includes a location ("LOC") field 316 that stores a value that specifies which memory 106 currently stores the corresponding page 120; that is, the "location" of the page 120 in the memory subsystem 104, with each memory 106 being assigned a corresponding location identifier.

As also explained above, in some embodiments the processing system 100 employs page migration to move pages from one memory 106 to another memory 106 for purposes of increasing access speeds, decreasing power consumption, or reducing write wear. Accordingly, in some embodiments the PTE 302 includes one or both of a ready-to-migrate (RTM) field 318 and a migration priority field 320. The RTM field 318 stores a bit value that indicates whether the corresponding page 120 is ready to migrate, while the migration priority field 320 stores a priority value used to weigh the selection of the corresponding page 120 for page migration. For example, a page seldom accessed could be marked for migration to a slower-access memory or a memory "further" away, in which case the RTM field 318 is set to an asserted bit field and the migration priority field 320 is set to a value indicating the priority of such a migration based on, for example, how seldom the page is accessed, the priority of the data or the type of migration contemplated, and the like. The page migration module 208 sets this priority value based on policy or other directives from the OS/HV 110, such as policy that specifies certain types of migrations as higher priority than others, such as prioritizing page migrations that decrease the average per-page access times over page migrations that decrease power consumption, or vice versa, as well as based on analysis of data collected by the data aggregation/reporting module 204, such as assigning a higher page migration priority to a first page and a lower page migration priority to a second page when the first page is accessed significantly more frequently than the second page. In other embodiments, the RTM status and migration priority status for one or more sets of pages 120 are stored in one or more data structures in a memory 106 and indexed using, for example, a physical base address or other identifier of the corresponding page.

Figure 4:
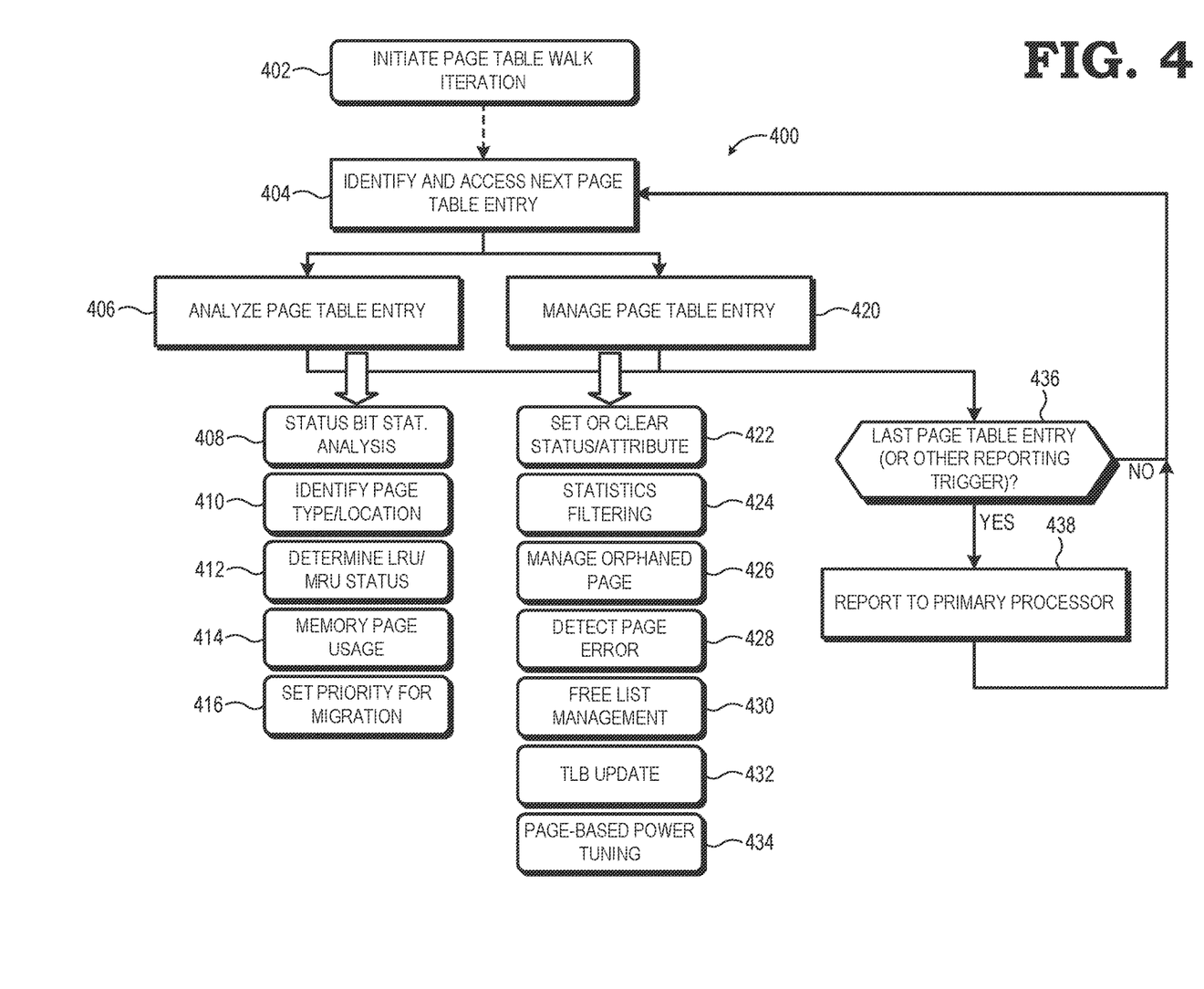
FIG. 4 is a flow diagram illustrating a method of page table assessment and management provided by the co-processor of FIGS. 1 and 2 in accordance with some embodiments.

Turning now to FIG. 4, a method 400 of operation of the MPU 108 for providing memory page management operations that are offloaded from the primary processor 102 or that enhance the conventional page management procedures provided by system software is described in accordance with some embodiments. The method 400 includes the page table walking process performed by the page table walker 202 as well as the PTE data collection, analysis, and reporting processes and PTE management processes performed by the data aggregation/reporting module 204 and the PTE management module 206, respectively, of the MPU 108.

In at least one embodiment, the aggregation, analysis, and reporting of page information and the management of PTEs is performed as part of the page table walking process performed by the page table walker 202, such that as each PTE is encountered during the page table walk, the PTE is analyzed, and any relevant analytic page data 134 is updated. Accordingly, description of method 400 begins with the page table walk process, which sequences, or "walks" through each PTE (e.g., PTE 302) of each page table 126 of an identified page table structure 124. As described above, in some implementations the base address of a given page table structure 124 is identified based on the PCID of the process/context represented by the page table structure 124. In one embodiment, the page table walker 202 maintains the list of all relevant PCIDs in an array, and selects each PCID in sequence and performs a page table walk through the page table structure 124 identified by that PCID, and upon completion selects the next PCID in the sequence and performs the page table walk for the page table structure 124 associated with that PCID, and so on. With this approach, the MPU 108 provides more comprehensive management of the memory pages 120, but at the expense of being less responsive, or having less current information on the process/context currently being executed. In other embodiments, the page table walker 202 walks the page table structure 124 of the process/context currently being executed, and when there is a context switch to the next process/context, the page table walker 202 switches to walking the page table structure 124 associated with that next process/context (and identified using, for example, the value loaded into the CR3 register 128). This page-table-switch with context switch approach, described below, facilitates maintenance of the most up-to-date page information for the current process/context at the expense of a less comprehensive assessment of the page information for all enabled processes/contexts.

In either approach, the page table walk process is initiated at block 402 with identification of whichever page table structure 124 is going to be traversed using the PCID as selected from a PCID array or as accessed from the CR3 register 128, depending on the mode. The page table walk process can be initiated by the OS/HV 110 via a command or other signal, or the MPU 108 can manage the page table walk process independently, either continuously cycling through one or more page table structures 124 or initiating a page table walk in response to a timer or other trigger. With the page table walk initiated, at block 404 the page table walker 202 selects the next (or first) PTE 302 (FIG. 3) of the page table structure 124 and accesses the selected PTE 302 from the corresponding page table 126.

For an accessed PTE 302, at block 406 the data aggregation/reporting module 204 collects and aggregates or otherwise analyzes information represented in the PTE 302 based on policy set by the OS/HV 110 and incorporates the results into one or more instances of the analytic page data 134. To illustrate, as represented by block 408, the data aggregation/reporting module 204 performs one or more statistical analyses of the PTEs 302 of a specified grouping, which includes, for example, all of the PTEs 302 associated with a process/context, with a particular memory 106, with a particular region of a memory 106, of memories 106 of a specified type, or some combination thereof. One example of the statistical analysis performed includes maintaining a count of the number of PTEs analyzed that represent pages 120 that have been accessed (as indicated by the accessed field 308 (FIG. 3) being set), as well as a list of all pages identified as having been identified as accessed, a ratio of accessed to unaccessed pages or accessed to total pages analyzed, and the like. Another example maintaining a count of the number of PTEs analyzed that represent pages 120 that have been modified (as indicated by the dirty field 310 (FIG. 3) being set), as well as a list of all pages 120 identified as having been modified, a ratio of dirty to clean pages or dirty to total number of pages, and the like.

As represented by block 410, the analysis performed at block 406 includes the data aggregation/reporting module 204 identifying one or both of the memory type (e.g., DRAM, SRAM, non-volatile RAM (NVRAM), etc.) and the memory location (e.g., the identifier of the particular memory 106) at which the corresponding page 120 is found, and then either or both of configuring the type field 314 and location field 316 (FIG. 3) of the PTE 302 to reflect this information, or populating corresponding fields of an instance of the analytic page data 134 with this information. As represented by block 412, the analysis performed at block 406 also includes identification of the most recently used (MRU) and least recently used (LRU) page 120 in implementations wherein the PTE 302 includes a last accessed timestamp field or similar attribute, with this determination made by, for example, comparing the last accessed timestamp of the PTE 302 being accessed with the most recently accessed and least recently accessed timestamps encountered thus far in the page table walk in progress.

As yet another example, block 414 represents an implementation of the analysis performed at block 406 in which the data aggregation/reporting module 204 builds and maintains a histogram or other statistical representation of memory page usage on a per-page, per-group of pages, per-memory region, or per-memory basis. To illustrate, as described below, the PTE management module 206, in some embodiments, operates to clear the accessed field 308 of a PTE 302 each time the PTE 302 is accessed during a page table walk iteration or based on some other policy specified by the OS/HV 110. Accordingly, if the accessed field 308 is set the next time the PTE 302 is accessed, this indicates that the page has been accessed, or "used", and thus the data aggregation/reporting module 206 reflect this usage by incrementing a usage metric for the corresponding page or other granularity of pages. A histogram of number of page uses for a specified grouping of pages then is compiled and updated with each PTE access. Likewise, a histogram or other representation of dirty page frequency or similar metrics is generated.

In embodiments in which the processing system 100 employs a page migration scheme, the analysis process of block 406 includes a page migration candidacy analysis as represented by block 416. To this end, the data aggregation/reporting module 204 evaluates statistics and other data pertaining to the page 120 gathered during one or more page table walk iterations to identify whether the page 120 is a candidate for page migration and, if so, sets a migration priority for the page 120. To illustrate, the data aggregation/reporting module 204 analyzes the memory page usage data gathered (at block 414) to determine a relative frequency of access to the corresponding page 120, and if the page 120 has a relatively high frequency of access but currently is located at a relatively-slow-access memory 106, the page 120 is identified as a high-priority candidate for page migration to a faster-to-access memory 106. As another example, a the statistical analysis represented by block 408 could reveal that a subset of pages 120 of a memory 106 with a higher power consumption are being accessed infrequently relative to the average frequency of page access for the memory 106, and thus each page 120 of this subset is identified as a candidate for migration to a different memory 106 that is available to be placed in a low-power state for longer periods of time due to the infrequency of access and the priority for such a migration set according to a policy specified by the OS/HV 110. As described above, in some embodiments, the candidacy of a page 120 for page migration and the priority for its migration are set by the MPU 108 by configuring the RTM field 318 and the migration priority field 320, respectively, of the accessed PTE 302. In other embodiments, the data aggregation/reporting module 204 maintains a data structure containing identifiers of pages 120 identified as candidates for page migration and corresponding identifiers of their determined migration priorities.

In some embodiments, the access of a PTE 302 at block 404 triggers the PTE management module 206 to perform one or more PTE management operations with respect to the accessed PTE 302 at block 420. These operations include one or more PTE management operations traditionally performed by the OS/HV via the MMU; additional PTE management operations that are extensions of, or additions to, the conventional PTE management capabilities; or a combination thereof. To illustrate, as represented by block 422, the management operations of block 420 include the setting or clearing of various status/attribute bits (or fields) of the PTE 302 being accessed. For example, if the accessed field 308 is set when the PTE 302 is accessed, this field is cleared so that the data aggregation/reporting module 204 is able to determine whether the corresponding page 120 has been accessed again after the last page table walk iteration. The dirty field 310 likewise set or cleared when the PTE 302 is accessed according to policy set by the OS/HV 110. As another example, as represented by block 424, the PTE management module 206 implements filtering of the statistics generated at block 406 based on policy from the OS/HV 110. To illustrate, the policy may specify that certain regions of a specified memory 106, or a specified memory 106 in its entirety, should be excluded from analysis, and the PTE management module 206 signals the data aggregation/reporting module 204 to refrain from including any analytic data gleaned from the corresponding PTEs 302. As represented by block 426, the PTE management operations performed at block 420 include the management of orphaned pages.

As yet another example, as represented by block 428, the PTE management module 206 detects, and in some instances corrects, errors in the PTE 302 or in the corresponding page table 126. To illustrate, if the PTE 302 has its dirty field 310 set but its accessed field 308 cleared, this indicates an inconsistency as if the corresponding page 120 has been modified, it by definition has also been accessed. In response to detecting this error, the PTE management module 206, in some embodiments, attempts to correct the error, such as by accessing each memory location within the page to determine whether the memory location has been modified, and if at least one modified memory location has been identified within the page, the PTE management module 206 concludes that the accessed field 308 has been erroneously cleared and thus sets the accessed field 308. However, if no modified memory location within the page is identified, then the PTE management module 206 concludes that the dirty field 310 has been erroneously set and thus corrects the PTE 302 by clearing the dirty field 310. In other embodiments, the PTE management module 206 identifies PTEs 302 or page tables 126 that appear to have errors but does not attempt to correct certain types of errors (as indicated by policy), and for such errors generates a list of potentially corrupted PTEs 302/page tables 126 and provides the list to the OS/HV 110 for handling and correction, or alternatively issues an interrupt or other exception to trigger the OS/HV 110 to handle the detected error.

As explained above, page allocation in the processing system 100 relies on the use of one or more free lists 132 that specify the physical pages in the memory subsystem 104 that are "free"—that is, available for allocation. As represented by block 430, in one embodiment the PTE management module 206 operates to manage the free list 132. This includes, for example, using the LRU/MRU information, memory page usage information, and other statistical information gathered by the data aggregation/reporting module 204 to identify pages 120 that have not been referenced recently or referenced relatively infrequently and which contain no modified data, and, in compliance with specified policy, mark such pages as available for allocation and injecting them into the free list 132. Further to ensure security of the page, the MPU 108 uses its own DMA capability or the DMA engine 118 to overwrite the physical page in the memory 106 with a specified value (e.g., all zeros) when it has been made available on the free list 132.

In some embodiments, the MPU 108 maintains the free list 132, but it is the OS/HV 110, along with the MMU 114, that allocate pages using the pages marked available in the free list 132. However, in other embodiments, the PTE management module 206 of the MPU 108 operates to perform some or all of the page allocations on behalf of the OS/HV 110 using the free list 132. To illustrate, the MMU 114, when needing a page allocated, signals the MPU 108, and the MPU 108 then selects an available physical page from the free list 132 for allocation, and then updates the page table structure 124 to include a PTE 302 for the selected page in the appropriate page table 126, and signals to the MMU 114 that the page has been allocated and the page table 126 has been updated accordingly.

As explained above, the primary processor 102 typically employs a TLB 130 to provide rapid PTE access for virtual-to-physical address translation for a small subset of the PTEs in the page table structure 124, with the PTEs in the TLB 130 typically representing the most recently accessed or the most frequently accessed pages 120. Accordingly, when the MPU 108 has modified a PTE 302 in the page table structure 124 that has a copy stored in the TLB 130, as represented by block 432 the PTE management module 206 updates the TLB 130 to reflect the change made to the corresponding PTE 302 in the page table structure 124. For example, if a page 120 is moved to the free list 132, then the MPU 108 accesses the TLB 130 to invalidate the corresponding copy of the PTE 302 in the TLB 130. As another example, if a status/attribute field has been modified, or the page has been migrated to a different memory 106 and thus has a new physical base address, then the MPU 108 accesses the copy of the PTE in the TLB 130 to make these same changes. As yet another example, if the MPU 108 is used to allocate a page, the MPU 108 also updates the TLB 130 to include an entry for the allocated page, depending on the policy specified by the OS/HV 110.

In some embodiments, the processing system 100 has the capacity to employ power tuning through the selective activation and deactivation of various memories 106 of the memory subsystem 104. Accordingly, as represented by block 434, the PTE management module 206 independently or at the directive of the OS/HV 110 identifies situations in which such power tuning is employable, and then either directly controls the placement into and removal of a memory 106 from a data-retaining, powered-down state, or provides a recommendation to the OS/HV 110, which then decides whether to implement power management for the memory 106. To illustrate, the PTE management module 206 determines from the analytic page data 134 generated by the data aggregation/reporting module 204 that most or all of the pages 120 of a particular memory 106 are being accessed relatively infrequently, and if consistent with policy, the PTE management module 206 either directly places the memory 106 into a data-retaining low-power state, or provides a recommendation to the OS/HV 110 to do so. Further, when doing so, the PTE management module 206 configures the PTEs 302 of the page 120 of the memory 106 with read-only bits so that an attempt to write to the memory 106 causes a page fault that is intercepted by the OS/HV 110 and which causes the OS/HV 110 (or the MPU 108) to restore the memory 106 to full power.

After the appropriate analytic and management operations have been performed using the accessed PTE 302 at blocks 406 and 420, respectively, at block 436 the data aggregation/reporting module 204 determines whether a reporting trigger has occurred. This reporting trigger includes, for example, a signal from the OS/HV 110 requesting updated page information, the expiration of a timer, the page table walker 202 reaching the last PTE 302 of the page table structure 124, a context switch initiation, and the like. If a trigger is present, then at block 438 the data aggregation/reporting module 204 provides information pertaining to the page table walk, analysis, and management performed by the MPU 108 since the last reporting instance. This information includes, for example, a representation of the analytic page data 134, an updated free list 132, page migration recommendations, page table error reports, and the like. The OS/HV 110 then acts on this reported information, such as by attempting to correct the identified page table errors, allocating pages based on the updated free list 132, initiating page migrations based on the recommendations, and the like. In other embodiments, the OS/HV 110 evaluates the information and then directs the MPU 108 to perform one or more page management actions based on its evaluation, such as directing the MPU 108 to perform certain page migrations, correct certain page table errors, etc. In the absence of any reporting requirement, or concurrent with the reporting process, the method 400 returns to block 404 whereupon the page table walker 202 selects and accesses the next PTE 302 in the page table structure 124 currently being traversed and the next iteration of the method 400 is performed for this selected and accessed PTE.

Figure 5:
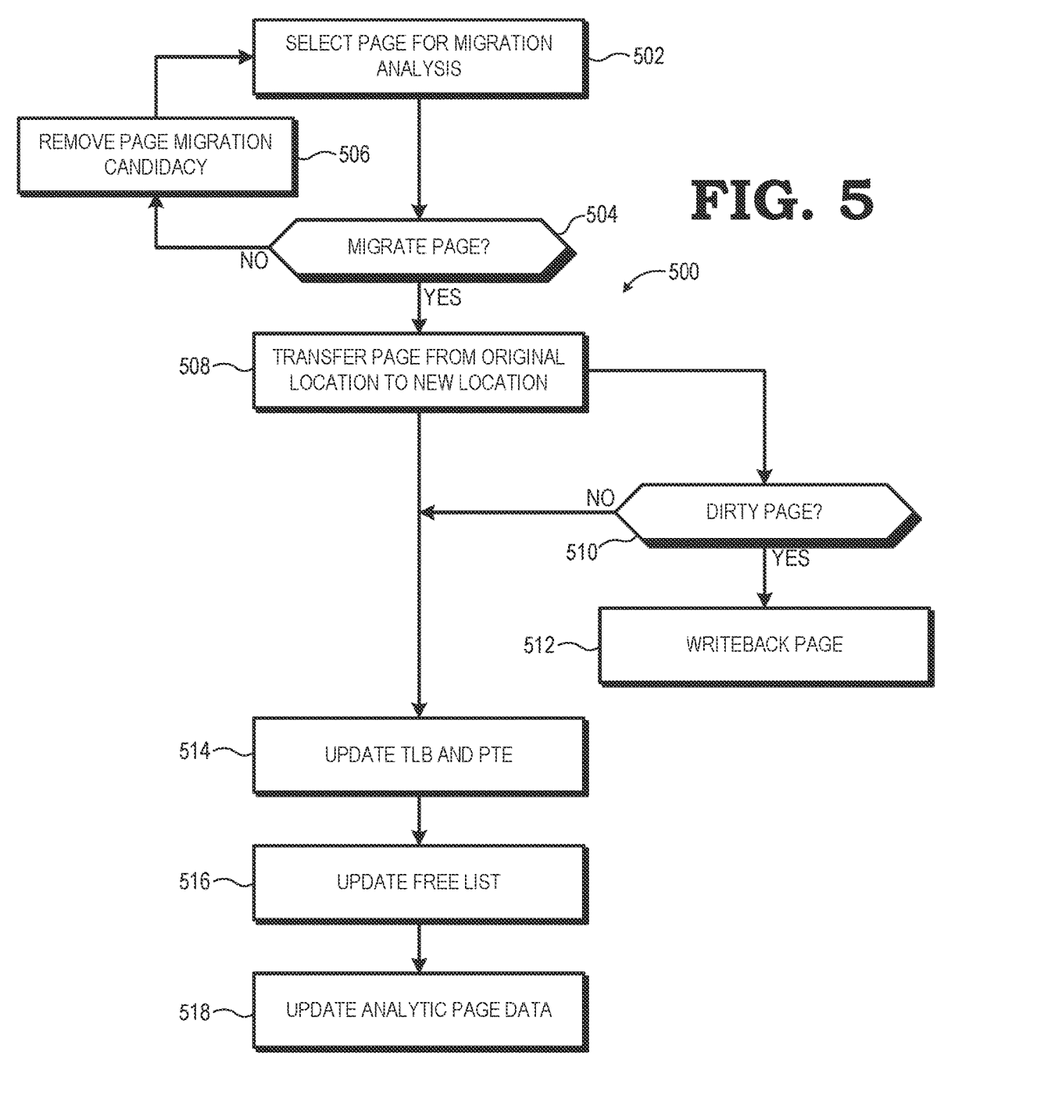
FIG. 5 is a flow diagram illustrating a method of page migration provided by the co-processor of FIGS. 1 and 2 in accordance with some embodiments.

FIG. 5 illustrates an example method 500 for page migration within the memory subsystem 104 that is at least partially supported by the MPU 108 in accordance with some embodiments. The method 500 initiates at block 502, with the selection of a page 120 marked as a candidate for page migration, either through a page migration candidate list or via setting of the RTM field 318 (FIG. 3) of the corresponding PTE 302. At block 504, the page migration module 208 analyzes the candidate page 120 in view of page migration guidance or other policy provided by the OS/HV 110 to determine whether the candidate page 120 should in fact be migrated to another memory 106. This analysis includes, for example, evaluation of the page migration priority in view of a weighting or hierarchy of page migration types (e.g., page migrations for speed preferred over page migrations for load balancing, which are preferred over page migrations for wear leveling, and so forth), evaluation in view of the estimated benefit to be gained by the page migration (e.g., migrating a page with a frequency of page access of X to a faster memory is more likely to provide a performance benefit over migrating a page with a frequency of page access of Y, where X>>Y). If the result of the analysis is to refrain from migrating the candidate page, in some embodiments the page migration candidacy of the selected page 120 is removed at block 506, such as by clearing the RTM field 318 of the corresponding PTE entry 302 or removing the page 120 from the page migration candidate list.

Otherwise, if the decision is to migrate the page, then at block 508 the data stored at the original location of the page 120 in the source memory 106 is copied to an identified location in a target memory 106, with the target memory 106 being selected based on any of a variety of factors pertaining to the motivation for the page migration, such as selection of a memory 106 with faster access times when the goal of the page migration is improved performance, or selection of a memory 106 with greater storage capacity when the motivation is to clear up space in the faster source memory 106. The original page location then is overwritten with a specified data pattern for security purposes.

Before, during, or after transferring the page 120 via copying of the data of the page, at block 510 the page migration module 208 accesses the dirty field 310 of the PTE 302 associated with the migrated page 120 to determine if it contained any modified data. If so, then at block 512, the page migration module 208 employs a DMA engine of the MPU 108 or the DMA engine 118 of the primary processor 102 to perform a writeback operation to store the modified page to the mass storage device from which the page originated.

At block 514, the PTE management module 206 updates the PTE 302 associated with the migrated page to reflect its new location in the target memory 106. This update includes, for example, updating the physical base address field 304 (FIG. 3) to reflect the new location, updating the type field 314 (FIG. 3) and location field 316 (FIG. 3), and clearing the RTM field 318 and the migration priority field 320. If a copy of the PTE 302 is also present and valid in the TLB 130, the PTE management module 206 updates the TLB 130 in a similar manner. As migration of the page 120 frees up a physical page in the source memory 106 and ties up a physical page in the target memory 106, at block 516 the page migration module 208 updates the free list 132 to remove the new location of the migrated page 120 from the free list 132 and to inject the old location of the migrated page 120 into the free list 132. Further, in some embodiments, at block 518 the data aggregation/reporting module 204 operates to update any part of the analytic page data 134 impacted by the page migration, such as by shifting the statistical data associated with the migrated page from the portion pertaining to the source memory 106, source memory region, or other source grouping to the portion pertaining to the target memory 106, target memory region, or other target grouping.

In some embodiments, the apparatuses and techniques described above are implemented in a system including one or more integrated circuit (IC) devices (also referred to as integrated circuit packages or microchips), such as the MPU 108 described above with reference to FIGS. 1-5. Electronic design automation (EDA) and computer-aided design (CAD) software tools often are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer-readable storage medium accessible to the computing system. Likewise, the code representative of one or more phases of the design or fabrication of an IC device is either stored in and accessed from the same computer-readable storage medium or a different computer-readable storage medium.

A computer-readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium, in some embodiments, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software includes the instructions and certain data that, when executed by the one or more processors, manipulate the one or more processors to perform one or more aspects of the techniques described above. The non-transitory computer-readable storage medium includes, for example, a magnetic or optical disk storage device, solid state storage devices such as Flash memory, a cache, random access memory (RAM) or other non-volatile memory device or devices, and the like. The executable instructions stored on the non-transitory computer-readable storage medium are implemented, for example, in source code, assembly language code, object code, or other instruction format that is interpreted or otherwise executable by one or more processors.

In accordance with one aspect, a system includes a primary processor couplable to a memory subsystem having at least one memory. The primary processor is to execute system software employing memory address translations based on one or more page tables stored in the memory subsystem. The system further includes a co-processor couplable to the memory subsystem. The co-processor is to perform iterations of a page table walk through one or more page tables maintained for the memory subsystem and to perform one or more page management operations on behalf of the system software and based on the iterations of the page table walk. In some embodiments, the one or more page management operations include: an operation by the co-processor to generate analytic page data for memory pages represented by at least a subset of page table entries accessed by the co-processor during the page table walk, the analytic page data based on values at one or more fields of the page table entries, and the analytic page data includes at least one of: a count of pages having a specified status or attribute, a statistical representation of pages having the specified status or attribute, or a listing of pages identified as having the specified status or attribute. In some embodiments, the one or more page management operations further include at least one of: an operation by the co-processor to maintain a free list of pages available for allocation based on the analytic page data; an operation by the co-processor to identify at least one page as a candidate for page migration based on the analytic page data; an operation by the co-processor to determine at least one of a most recently used (MRU) page or a least recently used (LRU) page based on the analytic page data; and an operation by the co-processor to identify a memory of the memory subsystem as a candidate for placing into a low-power state based on the analytic page data.

In some embodiments, the one or more page management operations includes at least one of: an operation by the co-processor to modify one or more fields of a page table entry; or an operation by the co-processor to invalidate or insert a page table entry into a page table. The one or more page management operations further can include an operation by the co-processor to modify a translation lookaside buffer of the primary processor responsive to modification of one or more fields of a page table entry or responsive to invalidating or inserting a page table entry into a page table.

In some embodiments, the one or more page management operations includes an operation by the co-processor to evaluate a page table entry or a page table accessed during the page table walk for errors. In some embodiments the one or more page management operations includes an operation by the co-processor to migrate a page from one memory of the memory subsystem to another memory of the memory subsystem. In some embodiments, the one or more page management operations includes at least one of: selecting a page for inclusion in a free list of pages available for allocation based on a page table entry for the page accessed during the page table walk; or allocating a page from the free list based on a request for page allocation from the primary processor. In some embodiments, the system software is to specify one or more policies for management of pages to the co-processor, and the co-processor is to perform the one or more page management operations based on the one or more policies. In some embodiments, the co-processor is to perform at least one of the one or more page management operations responsive to a command from the system or the co-processor is configured to perform at least one of the one or more page management operations independent of the system software. In other embodiments, the co-processor is configured to perform at least one of the one or more page management operations in coordination with the system software using one or more flags to prevent concurrent access attempts by both the primary processor and the co-processor. In some embodiments, the co-processor has limited general processing capabilities compared to the primary processor.

In accordance with another aspect, a co-processor is couplable to a primary processor and to a memory subsystem having at least one memory. The co-processor is to perform iterations of a page table walk of a set of one or more page tables, and generate analytic page data representative of the set of one or more page tables based on each page table entry of at least a subset of page table entries of the one or more page tables accessed during the page table walk. In some embodiments, the analytic page data includes at least one of: a count of pages having a specified status or attribute, a statistical representation of pages having the specified status or attribute, or a listing of pages identified as having the specified status or attribute.

In accordance with yet another aspect, a method of page management in a processing system having a primary processor, a co-processor, and a memory subsystem having at least one memory is provided. The method includes executing system software at the primary processor, wherein execution of the system software includes performing address translations based on one or more page tables maintained in the memory subsystem, performing, at the co-processor, iterations of a page table walk through the one or more page tables, and performing, at the co-processor, one or more page management operations on behalf of the system software and based on the iterations of the page table walk.

Note that not all of the activities or elements described above in the general description are required, that a portion of a specific activity or device may not be required, and that one or more further activities can be performed, or elements included, in addition to those described. Still further, the order in which activities are listed is not necessarily the order in which the activities are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A processing system, comprising:
a first processor including a translation lookaside buffer (TLB), the first processor configured to execute system software employing memory address translations based on one or more page tables stored in a memory subsystem; and
a second processor couplable to the memory subsystem, the second processor configured to perform iterations of a page table walk that checks each entry of one or more page tables maintained for the memory subsystem and to modify one or more existing TLB entries of the TLB based on the iterations of the page table walk.

2. The processing system of claim 1, wherein the second processor is configured to perform the iterations of the page table walk independent of a command from the first processor.

3. The processing system of claim 1, wherein the second processor is configured to maintain a free list of pages available for allocation based on the iterations of the page table walk.

4. The processing system of claim 3, wherein the second processor is configured to modify the one or more existing TLB entries based on the free list of pages available for allocation.

5. The processing system of claim 3, wherein the second processor is configured to:
based on allocating a page from the free list of pages available for allocation, update the TLB to include a TLB entry for the page.

6. The processing system of claim 3, wherein the second processor is configured to:
based on adding a page to the free list of pages available for allocation, invalidate an existing TLB entry associated with the page.

7. The processing system of claim 1, wherein the second processor is configured to:
make a modification to a page table entry of the one or more page tables based on the iterations of the page table walk; and
update an existing TLB entry of the one or more existing TLB entries based on the modification to the page table entry.

8. A method, comprising:
executing, at a first processor including a translation lookaside buffer (TLB), system software employing memory address translations based on one or more page tables stored in a memory subsystem; and
performing, at a second processor coupled to the memory subsystem, iterations of a page table walk that checks each entry of one or more page tables maintained for the memory subsystem and to modify one or more existing TLB entries of the TLB based on the iterations of the page table walk.

9. The method of claim 8, wherein the second processor is configured to perform the iterations of the page table walk independent of a command from the first processor.

10. The method of claim 8, further comprising:
maintaining, at the second processor, a free list of pages available for allocation based on the iterations of the page table walk.

11. The method of claim 10, further comprising:
modifying the one or more existing TLB entries based on the free list of pages available for allocation.

12. The method of claim 10, further comprising:
based on allocating a page from the free list of pages available for allocation, updating, at the second processor, the TLB to include a TLB entry for the page.

13. The method of claim 10, further comprising:
based on adding a page to the free list of pages available for allocation, invalidating, at the second processor, an existing TLB entry associated with the page.

14. The method of claim 8, further comprising:
making a modification to a page table entry of the one or more page tables based on the iterations of the page table walk; and
updating, at the second processor, an existing TLB entry of the one or more existing TLB entries based on the modification to the page table entry.

15. A processing system, comprising:
a first processor including a translation lookaside buffer (TLB), the first processor configured to execute system software employing memory address translations based on one or more page tables stored in a memory subsystem; and
a second processor couplable to the memory subsystem, the second processor configured to:
perform iterations of a page table walk through one or more page tables maintained for the memory subsystem;
maintain a free list of pages available for allocation based on the iterations of the page table walk; and
modify one or more existing TLB entries of the TLB based on the iterations of the page table walk.

16. The processing system of claim 15, wherein the second processor is configured to modify the one or more existing TLB entries based on the free list of pages available for allocation.

17. The processing system of claim 16, wherein the second processor is configured to:
update the TLB to include a TLB entry for the page based on allocating a page from the free list of pages available for allocation.

18. The processing system of claim 16, wherein the second processor is configured to:

invalidate an existing TLB entry associated with the page based on adding a page to the free list of pages available for allocation.

19. The processing system of claim 16, wherein the second processor is configured to:
make a modification to a page table entry of the one or more page tables based on the iterations of the page table walk; and
update an existing TLB entry of the one or more existing TLB entries based on the modification to the page table entry.

20. The processing system of claim 16, wherein the second processor is configured to perform the iterations of the page table walk independent of a command from the first processor.

* * * * *